US012617661B2

(12) United States Patent
Dasbach et al.

(10) Patent No.: US 12,617,661 B2
(45) Date of Patent: May 5, 2026

(54) SAFETY DEVICES FOR SCISSOR LIFTS AND RELATED METHODS

(71) Applicant: The Boeing Company, Arlington, VA (US)

(72) Inventors: Nikolas Dasbach, Berlin (DE); James E. Lynch, Snohomish, WA (US); Carlos D. Crespo-Quinones, Lynnwood, WA (US)

(73) Assignee: The Boring Company, Arlington, VA (US)

( * ) Notice: Subject to any disclaimer, the term of this patent is extended or adjusted under 35 U.S.C. 154(b) by 389 days.

(21) Appl. No.: 18/466,710

(22) Filed: Sep. 13, 2023

(65) Prior Publication Data

US 2025/0083938 A1 Mar. 13, 2025

(51) Int. Cl.
*B66F 17/00* (2006.01)

(52) U.S. Cl.
CPC .................................. *B66F 17/006* (2013.01)

(58) Field of Classification Search
CPC ....... B66F 17/006; B66F 17/00; B66F 17/065
See application file for complete search history.

(56) References Cited

U.S. PATENT DOCUMENTS

2008/0101905 A1 * 5/2008 Morris .................. A61G 5/104
414/540

* cited by examiner

*Primary Examiner* — Jason L Vaughan
*Assistant Examiner* — Amanda Kreiling
(74) *Attorney, Agent, or Firm* — Kolitch Romano Dascenzo Gates LLP

(57) ABSTRACT

Safety devices for scissor lifts comprise a block, a bracing structure, and an actuator. The block is configured to be fixed relative to a base of the scissor lift. The actuator is configured to selectively translate the bracing structure between a braced position, in which the bracing structure is operatively positioned between the block and a support leg of the scissor lift, and a retracted position, in which the bracing structure is not positioned between the block and the support leg of the scissor lift.

20 Claims, 12 Drawing Sheets

SAFETY DEVICES FOR SCISSOR LIFTS AND RELATED METHODS

FIELD

The present disclosure relates to safety devices for scissor lifts and to related methods.

BACKGROUND

Scissor lifts are work platforms used to safely move workers or components vertically and/or to different locations in a variety of industries including construction, manufacturing, retail, and entertainment. The lifting mechanism of a scissor lift moves the platform straight up and down using cross beams functioning in a scissor-like fashion. To keep a scissor lift in good usable condition, regular maintenance on a plurality of components of the scissor lift arranged under the platform is required. Due to the placement of these components, the scissor lift is often required to be in a vertically extended state during maintenance to allow a mechanic or other personnel access to the components under the platform; however, having maintenance performed under an extended scissor lift is a safety concern.

In some examples, such as in the manufacturing of an airplane wing, multiple scissor lifts may be arranged in close proximity to one another and/or between vertical supply racks, such that the only ways to access the components under the lift are to either crawl under the vertical racks or to walk underneath the platform(s) of the scissor lift(s) after it has been braced, blocked, and/or cribbed. However, in such an arrangement, depending on if the scissor lift has been braced, access underneath the platform is considered a permit required confined space. As such, there is a need for an automated device that braces and/or blocks a scissor lift.

SUMMARY

Scissor lift safety devices, systems for bracing a scissor lift, and methods for operating safety devices for scissor lifts are disclosed. Safety devices for a scissor lift comprise one or more blocks, a bracing structure, and an actuator. The one or more blocks are configured to be fixed relative to a base of the scissor lift. The actuator is configured to selectively translate the bracing structure between a braced position, in which the bracing structure is positioned between the block and a support leg of the scissor lift, and a retracted position, in which the bracing structure is not positioned between the block and the support leg of the scissor lift. In the braced position, the bracing structure is configured to restrict movement of the scissor lift support leg when the support leg translates towards and against the bracing structure.

Methods for operating scissor lift safety devices to restrict movement of a scissor lift comprise receiving a positioning command from a user and, in response to receiving the positioning command, translating the bracing structure between the retracted position and the braced position.

DESCRIPTION

Figure 1:
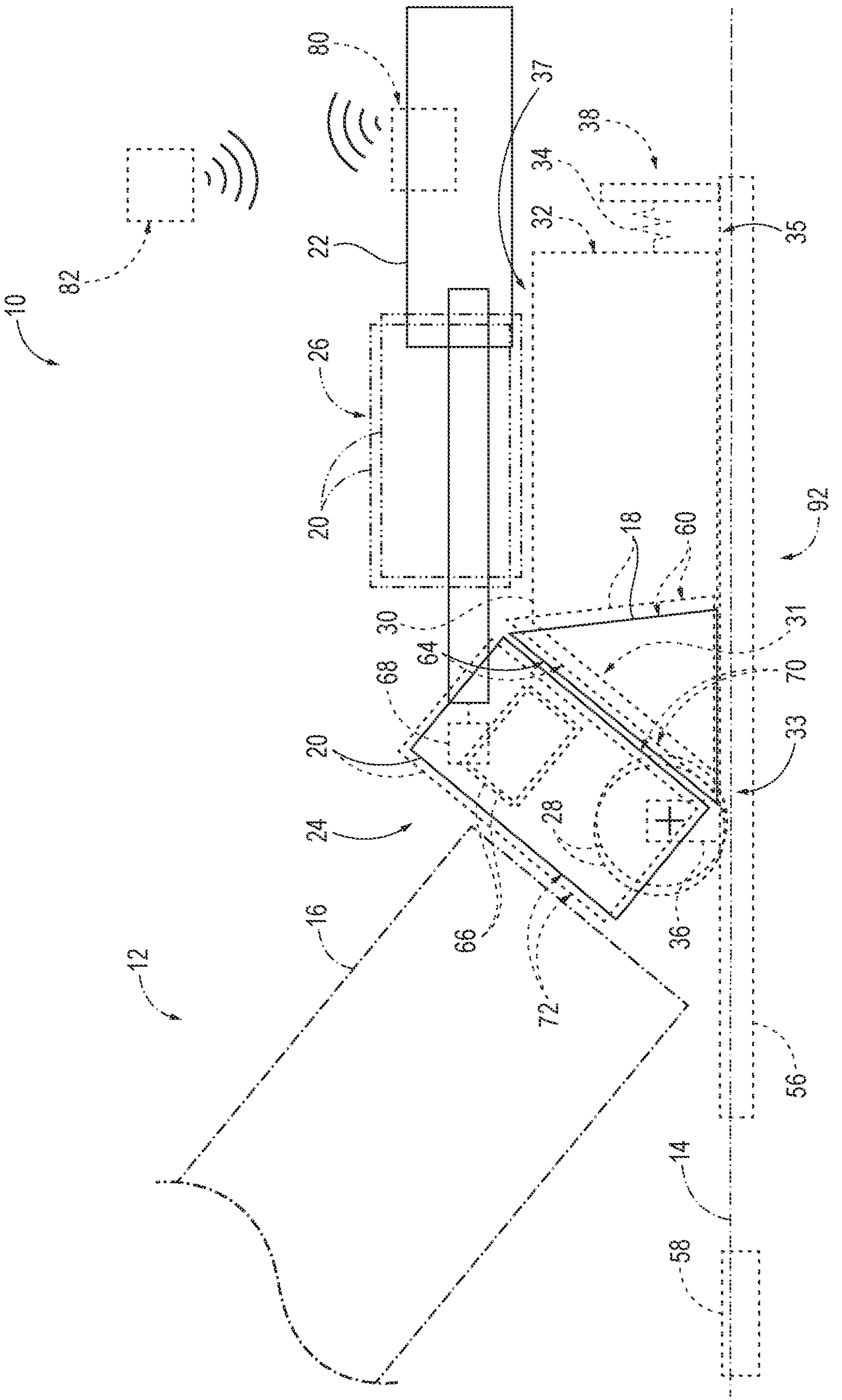
FIG. 1 is a schematic illustration representing scissor lift safety devices in accordance with aspects of the present disclosure.

Scissor lifts are work platforms configured to hold weight and translate straight up and down using cross beams (A.K.A support legs) functioning in a scissor-like fashion. In some examples, such as in the manufacturing of an airplane wing, multiple scissor lifts may be arranged in close proximity to one another and/or between vertical supply racks and used to hold components of the airplane wing and/or manufacturing personnel.

Each scissor lift generally comprises a platform, a base, a lift mechanism, and at least two pairs of support legs configured to translate along the base. Each pair of support legs include two legs rotatably coupled to one another at a central pivoting axis that is perpendicular to the length of the leg. The at least two pairs of support legs are operably coupled to an underside of the scissor lift platform on respective first ends and made to translate along the base on respective second ends in response to an actuating of the lift mechanism. By translating the support legs along the base, the scissor lift is transitioned along a central axis of the base between a vertically extended position in which the support legs are disposed at a minimum distance to the central axis of the scissor lift base and a collapsed position in which the support legs are disposed at a maximum distance from the central axis of the base.

Various components of the scissor lift, such as the lift mechanism, which is configured to translate the platform up and down, include a plurality of components that, if following the Occupational Safety and Health Administration (OSHA) guidelines, require routine inspection and maintenance. However, it is typical in scissor lift construction to arrange the majority of components needing routine inspection and/or maintenance below the platform such that the components of the lift mechanism are inaccessible when the scissor lift is in the collapsed position. As such, to perform maintenance and/or an inspection of the lift mechanism or other components, it is often required for the scissor lift to be in the vertically extended position. To ensure that scissor lifts do not unintentionally translate back along the base into the collapsed position during maintenance or inspection, manufacturers of scissor lifts often include a manually installed cribbing and/or bracing system configured to arrest movement of the scissor lift.

In some examples, a cribbing and/or bracing system of a scissor lift includes one or more bracing recesses disposed in the lateral sides of the base and one or more blocks configured to be manually placed in and received by the one or more bracing recesses of the base to arrest movement of the support legs in the event of an unplanned collapse of the scissor lift. For this type of cribbing and/or bracing system, it is often the case that each of the one or more bracing recesses are arranged in the base within the translating region (i.e., the region between the support legs minimum distance and maximum distance) adjacent the minimum distance location at which the support legs are disposed when the scissor lift is in the vertically extended position. As such, when the bracing blocks are placed within the one or more bracing recesses, they restrict the support leg(s) of the scissor lift from translating out of the vertically extended position. While the manually placed blocks accomplish the task of arresting movement of the support legs, the installation of the blocks creates a safety concern for the person manually installing the blocks.

In general, scissor lift safety devices in accordance with the present disclosure are configured to selectively arrest movement of the scissor lift without exposing a maintenance person or engineer to unnecessary dangers.

Safety devices for scissor lifts are schematically represented in FIG. 1. Generally, in FIG. 1, elements that are likely to be included in a given example are illustrated in solid lines, while elements that are optional to a given example or correspond to a specific example are illustrated in dashed lines. Elements that may be considered to be the environment in which a given example is arranged are illustrated in dash-dot lines. However, elements that are illustrated in solid lines are not essential to all examples of the present disclosure, and an element shown in solid lines may be omitted from a particular example without departing from the scope of the present disclosure.

A standard scissor lift 12 includes at least a platform, a base 14 having a central vertical axis along which the platform moves, a lift mechanism, and one or more support legs 16. When actuated by a user, the support legs 16, by way of the lift mechanism, are made to translate along the base 14 to transition the scissor lift between a vertically extended position in which the support legs 16 are disposed at a minimum distance from the central axis of the base 14 and a collapsed position in which the support legs 16 are disposed at a maximum distance from the central axis of the base 14. The region of the base 14 within which the support legs 16 are made to translate is called a translating region 92.

As schematically represented in FIG. 1, safety devices 10 include at least a block 18, a bracing structure 20, and an actuator 22. The block 18 is configured to be fixed relative to the base 14 of the scissor lift 12. The actuator 22 is configured to selectively translate the bracing structure 20 between a braced position 24 (illustrated in solid lines in FIG. 1), in which the bracing structure 20 is operatively positioned between the block 18 and the support leg 16 of the scissor lift 12, and a retracted position 26 (illustrated in dash-dot-dot lines in FIG. 1), in which the bracing structure 20 is not positioned between the block 18 and the support leg 16 of the scissor lift 12.

The block 18 may include at least a base contacting surface 60 configured to be fixedly coupled to the base 14 and a device engagement surface 64 configured to selectively engage with the bracing structure 20. The block 18 is configured to be fixedly coupled to the base 14 within the translating region 92 (i.e., region of the base 14 between the support legs 16 minimum distance position and maximum distance position) by way of the base contacting surface 60. In some examples, one or more blocks 18 are coupled to the base 14 adjacent the minimum distance position and within the translating region 92. The blocks 18 may include any suitable structure configured to selectively engage the bracing structure 20 within the translating region 92.

In some examples, the device engagement surface 64 of the blocks 18 includes a first ramped surface that is angled relative to the base 14. The first ramped surface may comprise an upper surface of the block 18. As such, the device engagement surface 64 comprises the upper surface of block 18 that is angled relative to the base 14 and configured to selectively engage the bracing structure 20 in response to a collapse of the scissor lift 12.

The bracing structure 20 may include any suitable structure configured to selectively interface with the blocks 18, the base 14, and/or the support leg 16 of the scissor lift 12 to arrest movement of support leg 16 that may occur in response to an unplanned collapsing of the scissor lift. In some examples, the bracing structure 20 is configured to interface with the base 14 of the scissor lift 12 by way of the blocks 18. The bracing structure 20 is operably coupled to the actuator 22 such that the actuator 22 is configured to selectively translate the bracing structure 20 towards or away from the scissor lift 12 to arrest or permit movement of the support leg 16 of the scissor lift 12. "Bracing," "blocking," and "cribbing" (and conjugations thereof) may be used interchangeably herein to describe structures used to temporarily support and/or secure a support leg 16 of the scissor lift 12.

In some examples, the actuator 22 is configured to selectively translate the bracing structure 20 between the braced position 24 and the retracted position 26. In the braced position 24, the bracing structure 20 restricts the scissor lift 12 from collapsing and/or translating into the collapsed position by engaging with the base 14 of the scissor lift 12 within the translating region 92 to prevent the support leg 16 of the scissor lift 12 from moving out of its minimum distance position. In some examples, the bracing structure 20 includes one or more bracing members 66 configured to interface with the block 18, the base 14, and/or the support leg 16 of the scissor lift, and an attachment member 68 coupled to the one or more bracing members 66. The attachment member 68 is configured to operably couple the one or more bracing members 68 to the actuator 22.

The bracing structure 20 may further include at least a first contacting surface 70 configured to selectively engage the device engagement surface 64 of the block 18 and/or a second contacting surface 72 configured to selectively engage a bottom end of the support leg 16 in the event of a collapse of the scissor lift. For example, in response to a failing of a lift mechanism of the scissor lift, the support legs 16 are pushed outwards by the gravitational load of the scissor lift platform as it falls and selectively engage with the second contacting surface 72 of the bracing structure 20. In response to the support legs 16 engaging with the second contacting surface 72, the bracing structure 20 is pushed in a direction towards the block 18 such that the first contacting surface 70 of the bracing structure 20 is brought into contact with the device engagement surface 64 of the block 18, thereby stopping any further movement of the support leg 16 and the bracing structure 20. The bracing structure 20 may include a structure having any size or shape suitable for interfacing with the blocks 18 and a bottom end of the support leg 16. The bracing structure 20 may comprise any heavy, durable, and/or resilient material having a high load capacity capable of withstanding and cushioning the load of the scissor lift.

The actuator 22 may include any actuator suitable for transitioning the bracing structure 20 between the braced position 24 and the retracted position 26 without interfering with the movements of the scissor lift, such as, a pneumatic, hydraulic, electronic, linear, rotary, cam, and/or any other suitable types of actuators. In some examples, the actuator 22 further includes a control unit 80 in communication with an external user interface 82 and configured to control the actuator 22 according to signals received from the external user interface 82. As such, the control unit 80 is configured to receive a signal representing a command to move the bracing structure 20 into either the braced position 24 or the retracted position 26, and in response to receiving the signal, operate the actuator 22 according to the received signal.

The control unit 80 may be any suitable device or devices that are configured to perform the functions of a controller discussed herein. For example, the control unit may include one or more of an electronic controller, a dedicated controller, a special-purpose controller, a personal computer, a special-purpose computer, a display device, a logic device, a memory device, and/or a memory device having non-transitory computer readable media suitable for storing computer-executable instructions for implementing aspects of systems and/or methods according to the present disclosure As schematically illustrated in dashed lines in FIG. 1, the safety device 10 also may include one or more rollers 28 operatively coupled to the bracing structure 20 and configured to assist in translating the bracing structure 20 between the braced position 24 and the retracted position 26. The one or more rollers 28 may have any shape or size suitable for rolling across a surface and moving the bracing structure 20 between various positions.

As also schematically illustrated in dashed lines in FIG. 1, the safety device 10 also may include one or more roller-surface bodies 32 positioned adjacent to a lateral side of each of the one or more blocks 18. Each of the one or more roller-surface bodies 32 have a front end 33 and a rear end 35 arranged opposite one another and a top side 37 that extends the entire distance between the front and rear ends. Each of the one or more roller-surface bodies 32 further includes a roller surface 30 disposed along the top side 37 of the roller-surface body 32 and shaped to at least partially receive a roller 28 of the one or more rollers 28. As such, the roller surface 30 may comprise the entire length of the top side 37 such that the roller surface 30 spans the entire distance between the front end 33 and the rear end 35 of the roller-surface body 32. In some examples, the roller-surface body 32 further includes at least one angled surface 31 disposed at the front end of the roller-surface body 32, and the roller surface 30 comprises the at least one angled surface 31. The at least one angled surface 31 may comprise a surface that runs parallel to the device engagement surface 64 of the block 18. The roller 28 is configured to roll along the roller surface 30 when the bracing structure 20 is translated between the braced position 24 and the retracted position 26.

In relation to the roller-surface body 32, the braced position 24 denotes the location of the bracing structure 20 when the bracing structure is disposed adjacent the front end of the roller-surface body 32, while the retracted position 26 denotes a position in which the bracing structure 20 is disposed adjacent the rear end of the roller-surface body 32.

As also schematically illustrated in dashed lines in FIG. 1, the safety device 10 also may include at least one sensor 36 in communication with the control unit 80 and configured to detect whether the bracing structure 20 is in the braced position 24. The at least one sensor 36 may be disposed at any location relative to the scissor lift that enables the at least one sensor 36 to detect whether the bracing structure 20 is in the braced position. In some examples, the sensor 36 is arranged on the base 14 spaced from the front end of the roller-surface body 32 and adjacent to the one or more blocks 18, such that the sensor 36 can detect when the bracing structure 20 is in the braced position 24.

In some examples, the roller 28 is disposed at a bottom edge of the bracing structure 20, such that when the bracing structure is in the braced position 24, the roller 28 is disposed next to the sensor 36. As such, in some examples, the sensor 36 may be configured to detect when the bracing structure 20 is in the braced position 24 by sensing the presence or absence of the roller 28. In response to determining that bracing structure 20 is in braced position 24, the sensor 36 is configured to transmit a signal of success to the control unit 80 and/or the user interface 82, and in response to determining that the bracing structure 20 is not in the braced position 24, the sensor 36 is configured to transmit a signal of failure to the control unit and/or user interface.

As also schematically illustrated in dashed lines in FIG. 1, the safety device 10 also may include a suspension structure 38 and at least one spring 34 that is operatively coupled to the roller-surface body 32 by way of the suspension structure 38. The at least one spring 34 is configured to bias the roller-surface body toward the bracing structure 20 when the bracing structure 20 is in the braced position 24.

The at least one spring 34 may comprise any suitable spring capable of exerting enough force to bias the roller-surface body 32 towards the bracing structure 20 when the bracing structure is in the braced position 24.

As also schematically illustrated in dashed lines in FIG. 1, the safety device 10 also may include a support slab 56 and/or a leveling slab 58 configured to be disposed between the scissor lift 12 and a surface (i.e., the ground) on which the scissor lift is arranged. The support slab 56 is configured to be arranged under the same end of the scissor lift 12 on which the safety device 10 is installed, such that components of the safety device 10 may be coupled to the support slab 56 through openings in the base 14 of the scissor lift. The leveling slab 58 is configured to be arranged under an end of the scissor lift 12 that is opposite the end on which the safety device 10 is installed. In some examples, the support slab 56 and/or the leveling slab 58 are further configured to couple with the base 14 of the scissor lift such that both the scissor lift and the components of the safety device 10 are mounted to the same support slab 56.

Turning now to FIGS. 2-13, an illustrative non-exclusive example of safety device 100 or portions thereof are depicted. Where appropriate, the reference numerals from the schematic illustration of FIG. 1 are used to designate corresponding parts of the example of FIGS. 2-13; however, the examples of FIGS. 2-13 are non-exclusive and do not limit the safety devices 10 to the illustrated embodiment of FIGS. 2-13. That is, the safety device 100 may incorporate any number of the various aspects, configurations, characteristics, properties, etc. of the safety devices 10 that are illustrated in and discussed with reference to the schematic representations of FIG. 1 and/or the embodiment of FIGS. 2-13, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the example of FIGS. 2-13; however, it is within the scope of the present disclosure that the previously discussed features, variants, etc. may be utilized with the example of FIGS. 2-13.

Figure 2:
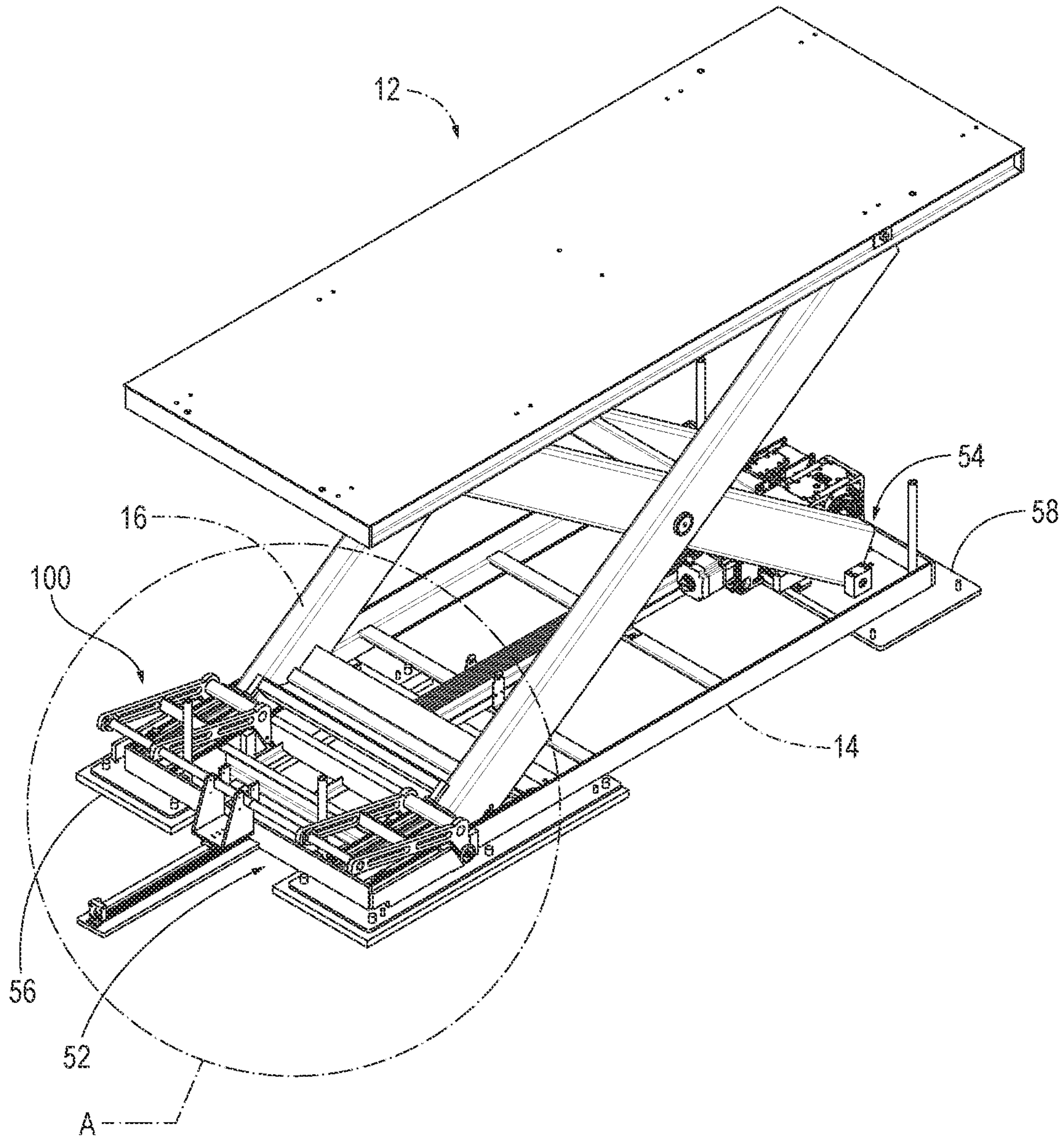
FIG. 2 is a perspective view of an example safety device installed on a scissor lift in accordance with aspects of the present disclosure.
Figure 3:
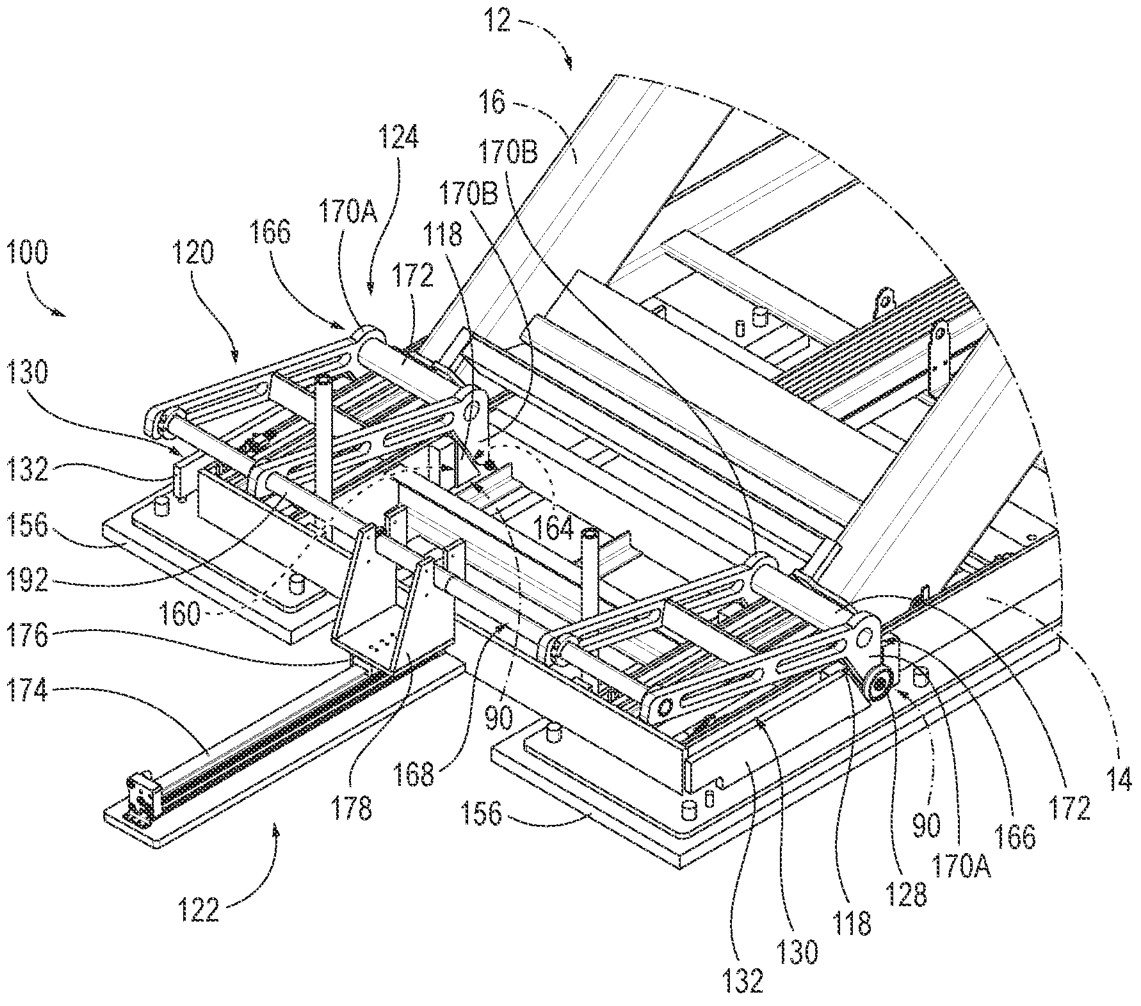
FIG. 3 is an enlarged view of portion A depicted in FIG. 2.
Figure 4:
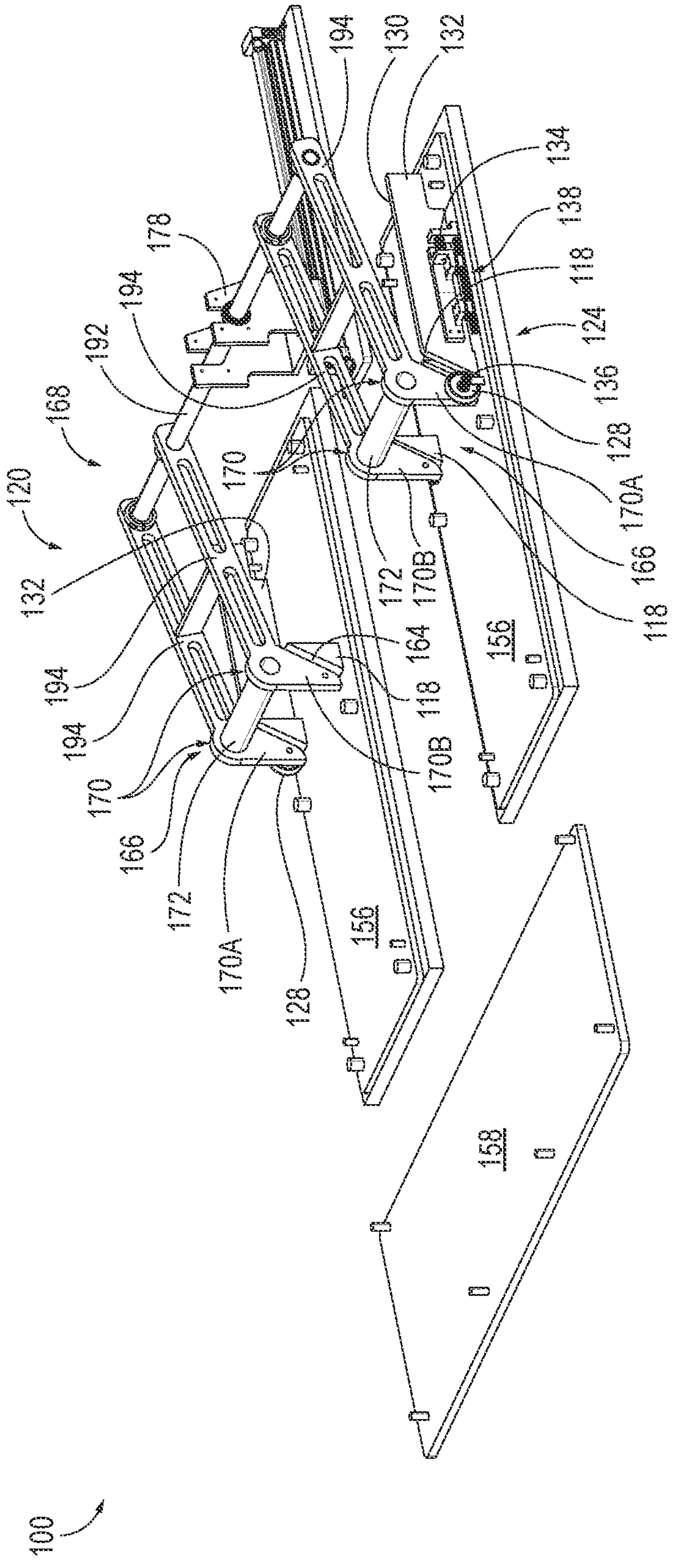
FIG. 4 is a perspective view of the safety device of FIG. 2.
Figure 5:
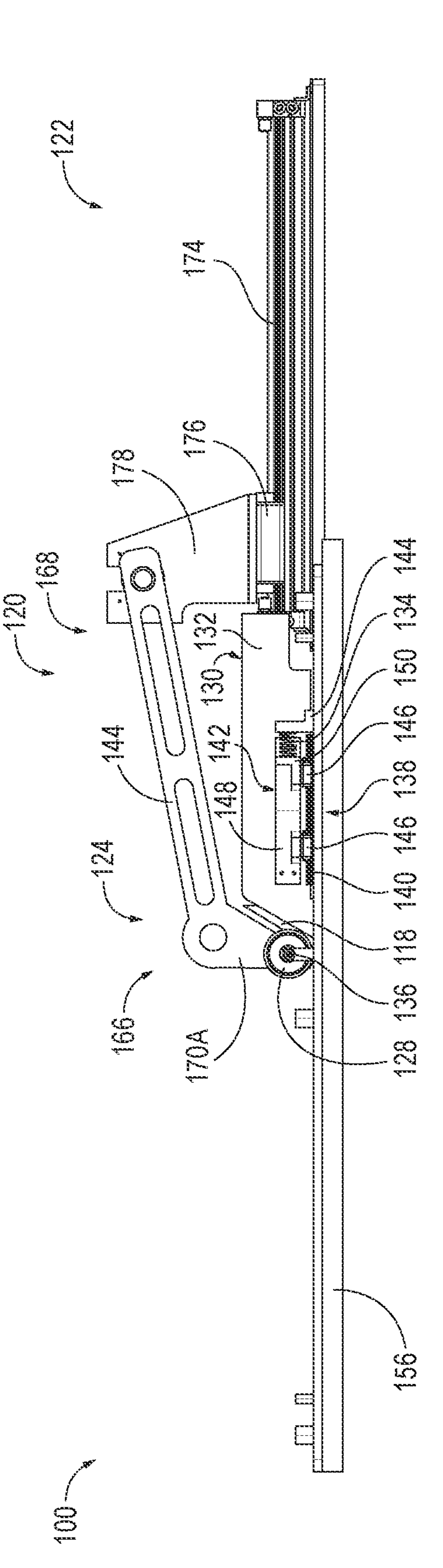
FIG. 5 is a side view of the safety device of FIG. 2 depicting a bracing structure of the safety device in an engaged position, in accordance with aspects of the current disclosure.
Figure 6:
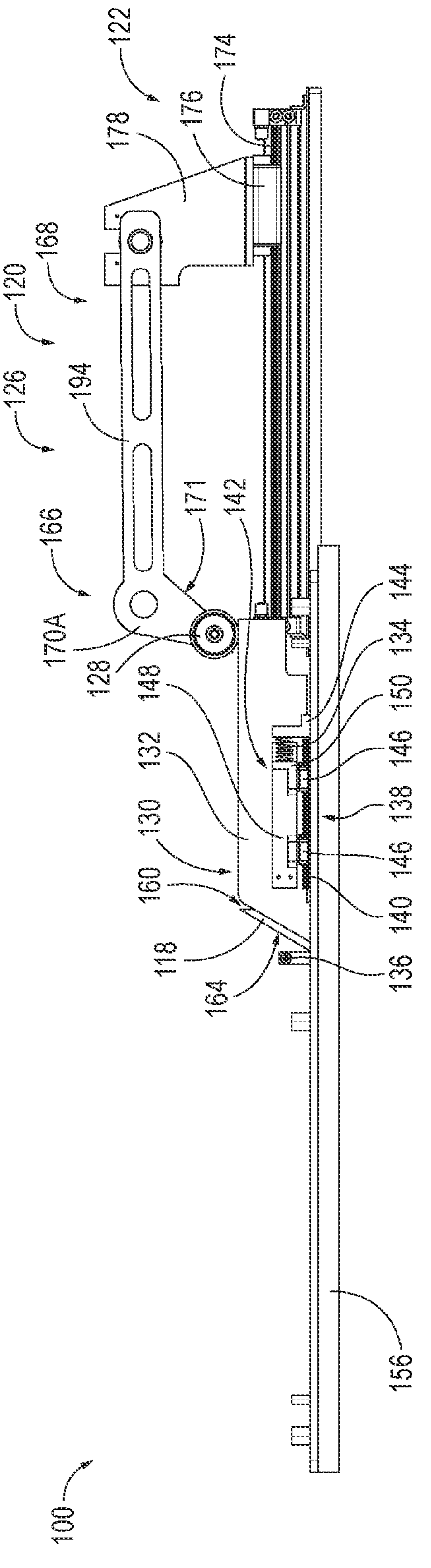
FIG. 6 is a side view of the safety device of FIG. 2 depicting the bracing structure of the safety device in a retracted position, in accordance with aspects of the current disclosure.

As seen in FIGS. 2-13, the safety device 100 is an example of the safety device 10 described above. FIGS. 2-3, and 7-13 depict the safety device 100 installed on a scissor lift 12 (i.e., environment) while FIGS. 4-6 depict just safety device 100.

As discussed above, a standard scissor lift 12 includes at least a platform, a lift mechanism, one or more support legs 16, and a base 14 having a first end 52, a second end 54 opposite the first end, and central vertical axis along which the platform moves. A manufacturer-provided safety system for a scissor lift 12 often includes a pair of bracing recesses 90 disposed on opposite sides of the base 14 within the translating region and configured to receive a manufacturer-designed block to arrest movement of the support legs 16 when the scissor lift is in the vertically extended position.

FIGS. 2-3 depict the safety device 100 installed on the scissor lift 12 (i.e., environment) at the first end 52 of the base 14. FIG. 4 depicts the components of the safety device 100. The safety device 100 includes one or more blocks 118, a bracing structure 120, and an actuator 122.

The safety device 100 further includes a support slab 156 and a leveling slab 158 configured to be disposed under the first end 52 and the second end 54 of the scissor lift 12, respectively, between the scissor lift and the ground. The support slab 156 may include a plurality of apertures and/or protrusions coupled with mounting hardware of the scissor lift 12 and/or coupled with one or more other components of the safety device 100, such that the scissor lift and/or other components of the safety device 100 are fixedly coupled to support slab 156.

As depicted in FIGS. 3-4, blocks 118 are disposed within the existing bracing recesses 90 of the base 14 and fixedly coupled thereat. As such, each block 118 has a base contacting surface 160 coupled to the base 14, a slab contacting surface fixed to the support slab 156, and/or a device engagement surface 164 engaged with bracing structure 120.

The device engagement surface 164 of each of the one or more blocks 118 comprises a first ramped surface that is angled relative to the base 14 such that when the one or more blocks 118 are disposed within the bracing recesses 90 of the scissor lift 12, the device engagement surface forms a ramp that extends diagonally from a bottom front edge of the bracing recess to a top rear edge of the bracing recess. As such, the one or more blocks 118 each comprise a right-angle triangular prism where a vertical rectangular side of the prism is the base contacting surface, a horizontal rectangular side of the prism is the slab contacting surface, and the diagonal rectangular side of the prism is the device engagement surface 164. In other examples, the one or more blocks 118 have any shape or size suitable for positioning within a bracing recess and interfacing with the bracing structure 120.

As shown in FIG. 4, the bracing structure 120 includes one or more brace members 166 and at least one attachment member 168 coupled to the one or more brace members 166. Each of the one or more brace members 166 include at least a first contacting surface 170 configured to selectively engage the device engagement surface 164 of the block 118 and a second contacting surface 172 configured to selectively interact with a bottom end of the support leg 16. In the example of FIGS. 2-13, the bracing structure 120 includes a pair of brace members 166, each brace member 166 having a first contacting surface 170 comprising a pair of contact structures 170A and 170B. Contact structures 170A and 170B may have any correlating shape or size that, when together with the shape and size of the one or more blocks 118, are sized to fit within the bracing recesses of the base 14. As shown in FIG. 4, the contact structures 170A and 170B have an upside-down teardrop-shaped cross-section, such that each contact structure 170A and 170B has a large rounded top section and smaller more pointed bottom section that extends downwards in a first direction from the top section.

The second contacting surface 172 is disposed between and fixedly coupled to inner surfaces of the top section of the contact structures 170A and 170B such that the contact structures 170A and 170B are spaced from one another by the second contacting surface 172 extending in a second direction transverse to the first direction. The Contact structures 170A and 170B further comprise apertures disposed in the top section of the contact structure and configured to receive and fixedly couple the second contacting surface 172 to the contact structures 170A and 170B of the first contacting surface 170.

The attachment member 168 includes a main crossbar 192 and one or more arms 194 extending transversely from the main crossbar. Each of the one or more arms 194 have a first end transversely coupled to the main crossbar 192 and a second end coupled to a rear top side of a contact structure 170A or 170B of each first contacting surface 170, such that each of the one or more arms 194 extends from the top section of the contact structure 170A or 170B in a third direction that is also transverse to the second direction. The attachment member 168 further includes supportive beams configured to be fastened across pairs of the one or more arms 194 to add rigidity to the attachment member 168.

The contact structures 170A and 170B of the first contacting surface 170 further include a block-contacting surface 171 disposed on a rear side of the lower portion of the contact structure to selectively engage the device engagement surface 164 of the block 118. The block-contacting surface 171 extends on the rear side of the contact structures 170A and 170B between the one or more arms 194 and the pointed end of the contact structures 170A and 170B.

The safety device 100 further includes a roller 128 operatively coupled to each bracing structure 120 to assist in translating the bracing structure 120 between the braced position 24 and the retracted position 26 (see FIGS. 5-6).

The brace member 166 of the bracing structure 120 is operably coupled to the actuator 122 by way of the attachment member 168. The actuator 122 comprises at least a guide rail 174, a guide block 176 configured to translate along the guide rail 174, and an attachment structure 178 fixedly coupled to the guide block 176, such that the attachment structure 178 translates together with the guide block 176 along the guide rail 174. The attachment structure 178 of the actuator 122 receives the at least one attachment member 168 of the bracing structure 120 to operably couple the bracing structure 120 to the actuator 122. As shown in FIGS. 2-13, the attachment structure 178 includes one or more slots that receive a middle portion of the main crossbar 192, such that the attachment structure 178 is pivotably coupled to the attachment member 168 of the bracing structure 120.

As such, the actuator 122 selectively translates the bracing structure 120 between a braced position 124 (FIG. 5), in which the bracing structure 120 is operatively positioned between the block 18 and the support leg 16 of the scissor lift 12, and a retracted position 126 (FIG. 6), in which the bracing structure 120 is not positioned between the block 18 and the support leg 16 of the scissor lift 12. In the braced position 124, the bracing structures 120 restrict the scissor lift 12 from collapsing and/or translating into a collapsed position.

As shown in FIGS. 5 and 6, each attachment member 168 of the bracing structure 120 rotates, or pivots, within the attachment structure 178 of the actuator 122 in response to the translation of the bracing structure 120 between the braced position 124 and the retracted position 126.

The safety device 100 further includes roller-surface bodies 132 disposed adjacent a lateral side of each block 118. A roller-surface body 132 comprises a structure that includes a front end 33 and a rear end 35 arranged opposite one another, and a top side that 37 extends the entire distance between the front and rear ends. The roller-surface body 132 further includes at least one angled surface disposed at the front end of the roller-surface body 132. The angled surface of the roller-surface body 132 extends parallel with device engagement surface 164 of the block 118. Each of the one or more roller-surface bodies 132 further have a roller surface 130 disposed along the top side 37 of the roller-surface body 132 and shaped to at least partially receive a roller 128 of the one or more rollers 128. The roller surface 130 includes the angled surface and/or a surface of the top side 37 of the roller-surface body 132. The retracted position 126 (FIG. 6) is further defined as a position of the bracing structure 120 at which the rollers 128 and/or the first contacting surface 170 of the bracing structure 120 are disposed on the roller surface 130 adjacent the rear end of the roller-surface body 132.

The structure of the roller-surface body 132 is sized such that the one or more rollers 128 translate from a position above a max height of the base 14 (FIG. 7) to a position below the max height of the base 14 (FIG. 8) by rolling along the roller surface 130. In other words, the bracing structure 120 is disposed above the max height of the base 14 when in the retracted position 126 and is disposed below the max height of the base 14 when in the braced position 124. The at least one attachment member of the bracing structure 120 is configured to pivot within the attachment structure 178 of the actuator 122 in response to the rollers 128 rolling along the roller surface 130 to translate the bracing structure from the retracted position, above the max height of the base 14, to the braced position, below the max height of the base 14, and vice versa. As such, the roller-surface body 132 functions as a ramp that facilitates the placement and removal of the bracing structure 120 over the base 14 of the scissor lift 12.

Figure 7:
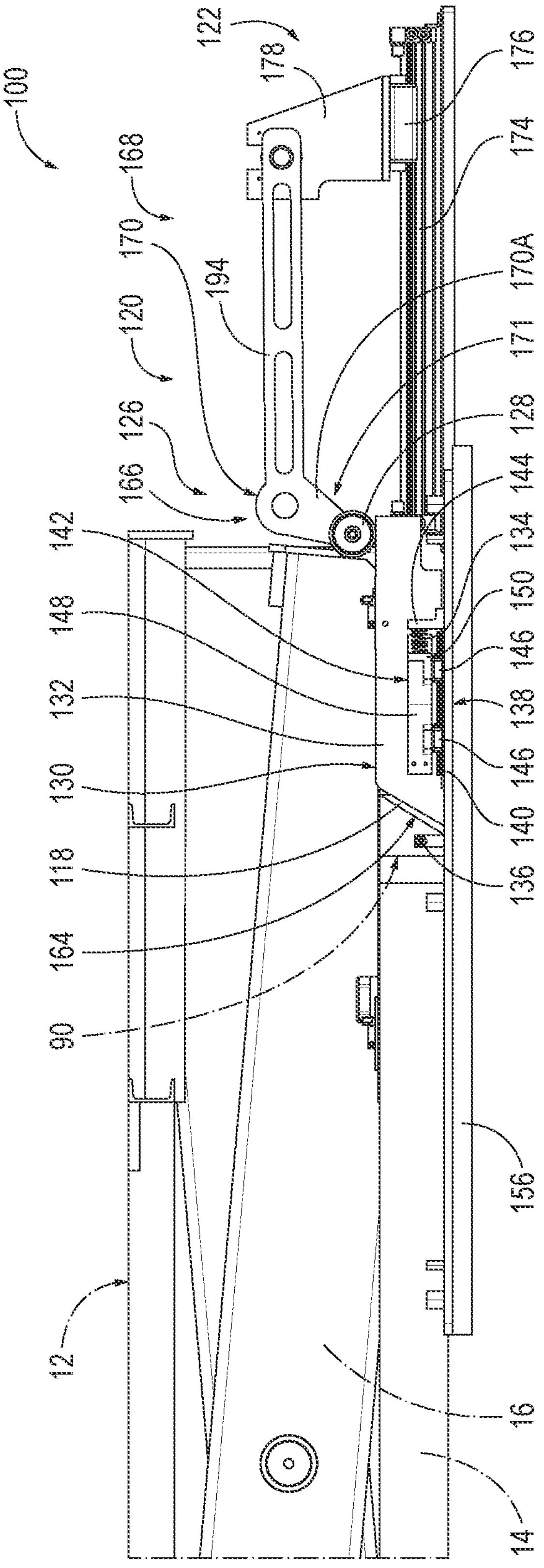
FIG. 7 is a side view of the safety device of FIG. 2 installed on a collapsed scissor lift, depicting the spatial relationship between the collapsed scissor lift and the safety device when the bracing structure is in the retracted position in accordance with aspects of the present disclosure.
Figure 8:
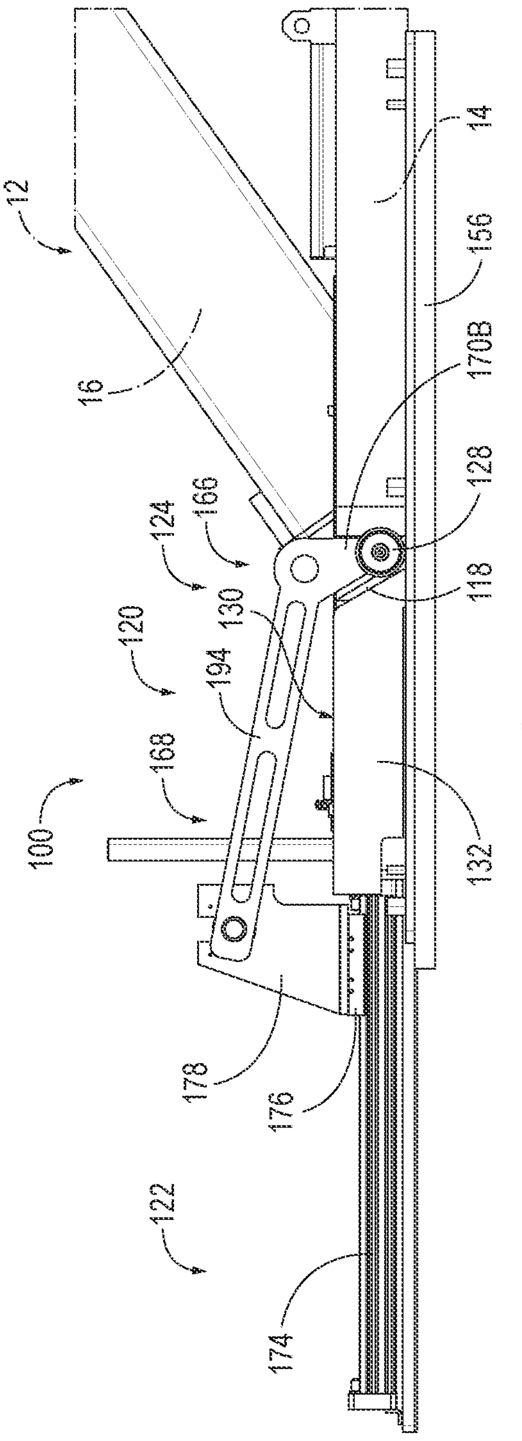
FIG. 8 is a right side view of the safety device of FIG. 2 installed on a lifted scissor lift, depicting the relationship between components of the lifted scissor lift and the safety device when the bracing structure is in the engaged position in accordance with aspects of the present disclosure.
Figure 9:
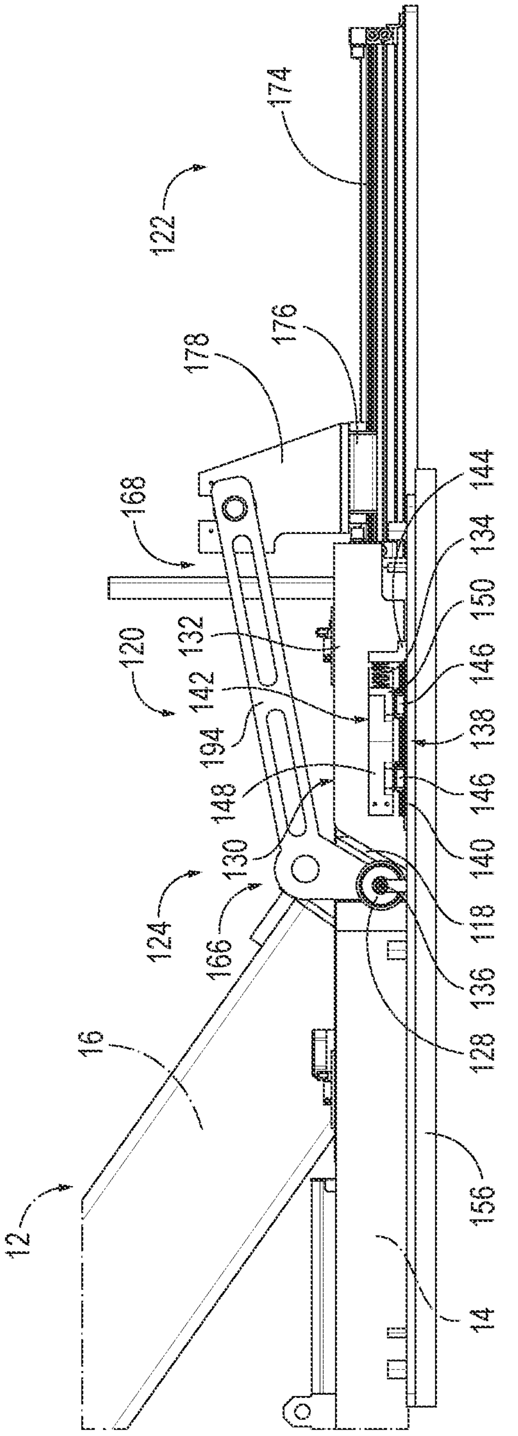
FIG. 9 is a left side view of the safety device of FIG. 2 installed on a lifted scissor lift, depicting the relationship between components of the lifted scissor lift and the safety device when the bracing structure is in the engaged position.

FIG. 7 depicts the safety device 100 installed on a scissor lift 12 with the bracing structure 120 in the retracted position 126. The structure of the roller-surface body may further be sized such that when disposed adjacent the lateral side of the block 118 and/or an outer surface of the base 14, the rear end of the roller-surface body 132 extends past the first end 52 of the scissor lift base 14. In the retracted position 126, the rollers 128 and/or the first contacting surface 170 of the bracing structure 120 is disposed adjacent the rear end of the roller-surface body 132 and thus past the first end of the base 14, such that all components of the bracing structure 120 are disposed outside of the scissor lift structure. With an entirety of bracing structure 120 out of the way, the scissor lift 12 is permitted to translate into the collapsed position without any interference from components of the safety device 100. Accordingly, as depicted in FIG. 7, the safety device 100 does not interfere with any movement of the scissor lift when the bracing structure 120 is in the retracted position 126.

The safety device 100 further includes a sensor 136 that detects when the bracing structure 120 is in the braced position. The sensor 136 is disposed on one of the support slabs 156 at a position adjacent to one of the rollers 128 when the bracing structure 120 is in the braced position 124. As such, the sensor 136 detects when the bracing structure 120 is in the braced position 124 by sensing the presence or absence of the roller 128. In response to sensing the presence of the roller 128 within the braced position 124, the sensor 136 transmits a confirmation signal to a user and/or to the control unit 80 in communication with the user. The sensor 136 further transmits a signal of failure to the user and/or the control unit 80 in communication with the user in response to not sensing the presence of the roller 128 within the braced position 124.

Figure 10:
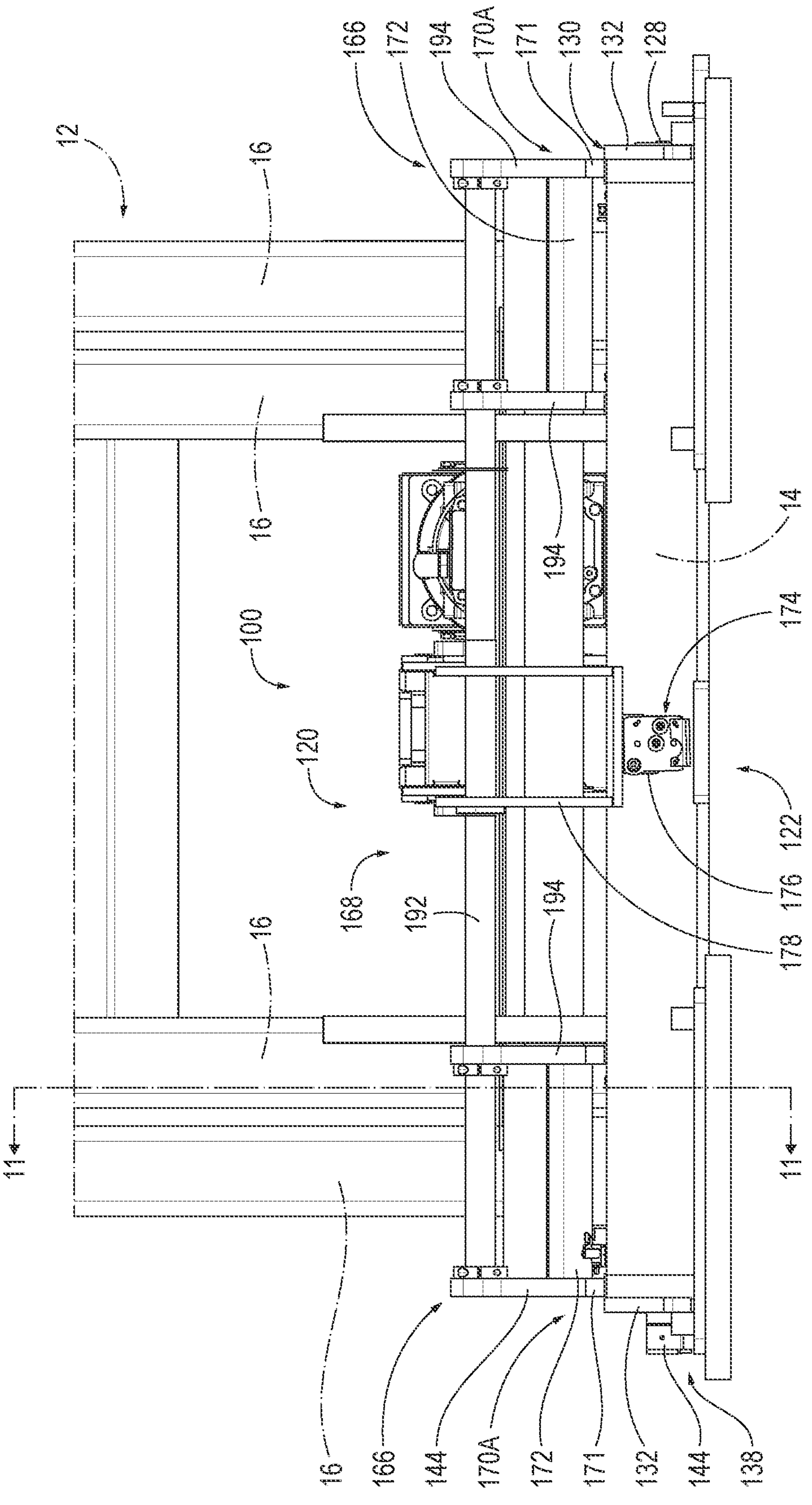
FIG. 10 is a rear view of the safety device and scissor lift of FIG. 2 in accordance with aspects of the current disclosure.
Figure 11:
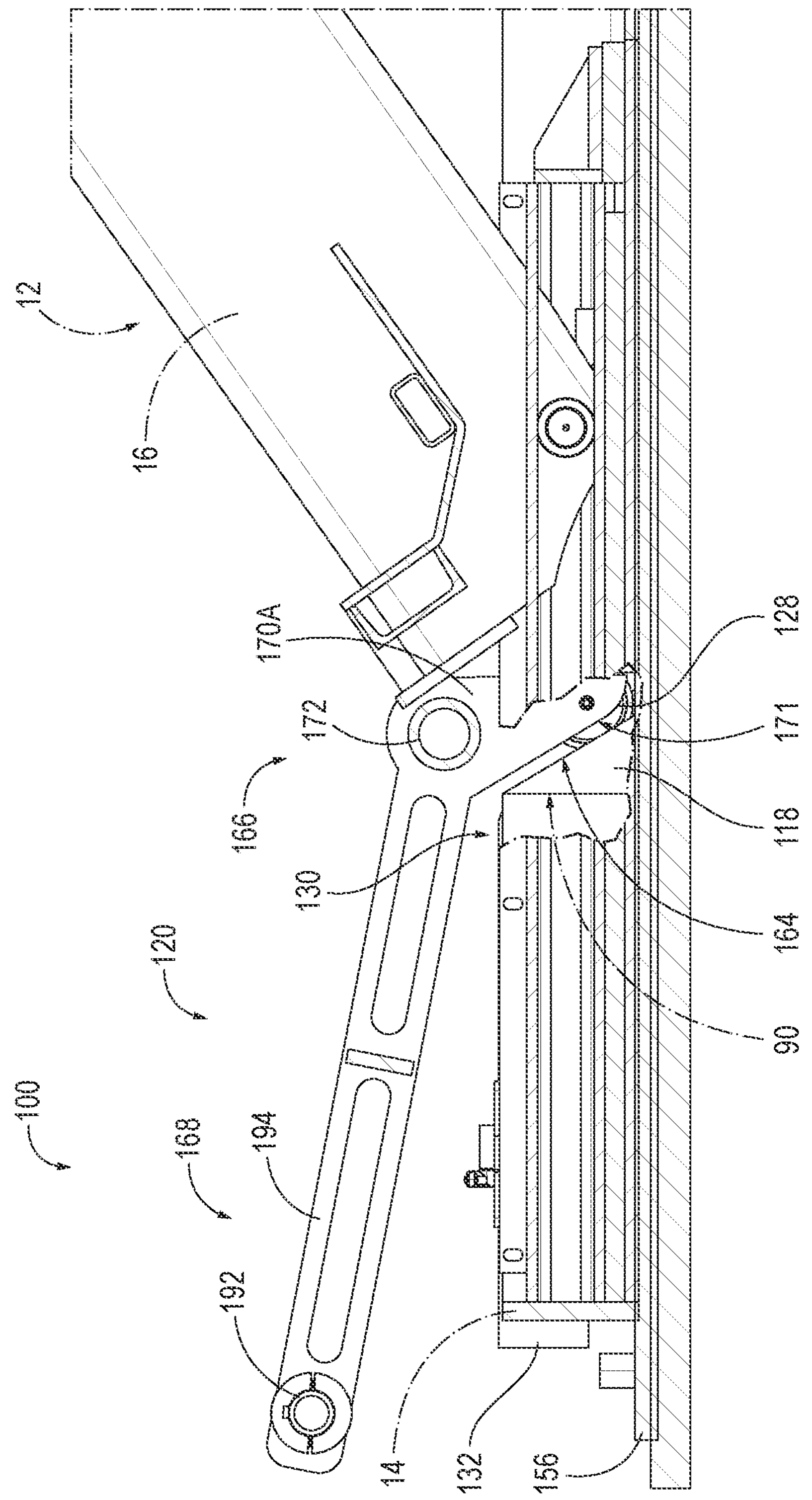
FIG. 11 is a sectional cut-away view of the safety device and scissor lift of FIG. 2 along plane 11 in FIG. 10, depicting the bracing structure spaced from a leg of the scissor lift and a block of the safety device, in accordance with aspects of the current disclosure.

FIG. 11 is a sectional cut-away view of the safety device 100 and the scissor lift 12 along plane 11 in FIG. 10, depicting the structural relationship between components of the safety device 100 and the scissor lift 12 prior to a scissor lift collapse when the bracing structure 120 is in the braced position 124. The safety device 100 is a system configured to prevent a complete collapse of a scissor lift in the event of a lift mechanism failure. As such, the load bearing components (e.g., the blocks 118, the bracing structure 120) of the safety device 100 only hold a load of the scissor lift 12 in response to a failing of the scissor lift. Accordingly, to avoid unnecessary stress to the safety device 100, the bracing structure 120 is only translated into the braced position 124 in response to the scissor lift being placed into the vertically extended position at which the support legs 16 are disposed at a minimum distance from the central axis of the base 14. As shown in FIG. 11, in the braced position, the bracing structure 120 is disposed between and spaced from the block 118 and the support legs 16 such that the bracing structure 120 only engages with the support legs 16 in response to an increase in the distance between the support legs 16 and the central axis of the base 14. The roller-surface body 132 is disposed adjacent and set back from the block 118 and/or the outer surface of the base 14 such that the angled portion of the roller surface 130 that runs parallel to the device engagement surface 164 of the block 118 is spaced from the device engagement surface (see FIG. 11). The angled portion of the roller surface 130 is spaced from the device engagement surface 164 by a distance less than a radius of the roller 128. By spacing the roller-surface body 132 a distance less than a radius of the roller 128 away from the block 118, the bracing structure 120, by way of the rollers 128, is permitted to translate between the braced position and retracted position without the block contacting surface 171 of the bracing structure 120 coming into contact with the block 118. As such, prior to a scissor lift collapse, the block contacting surface 171 of the bracing structure 120, in the braced position, is spaced from the device engagement surface 164 of the block 118 (see FIG. 11) while the rollers 128 operably coupled to the bracing structure 120 are in contact with the roller-surface body 132.

Figure 12:
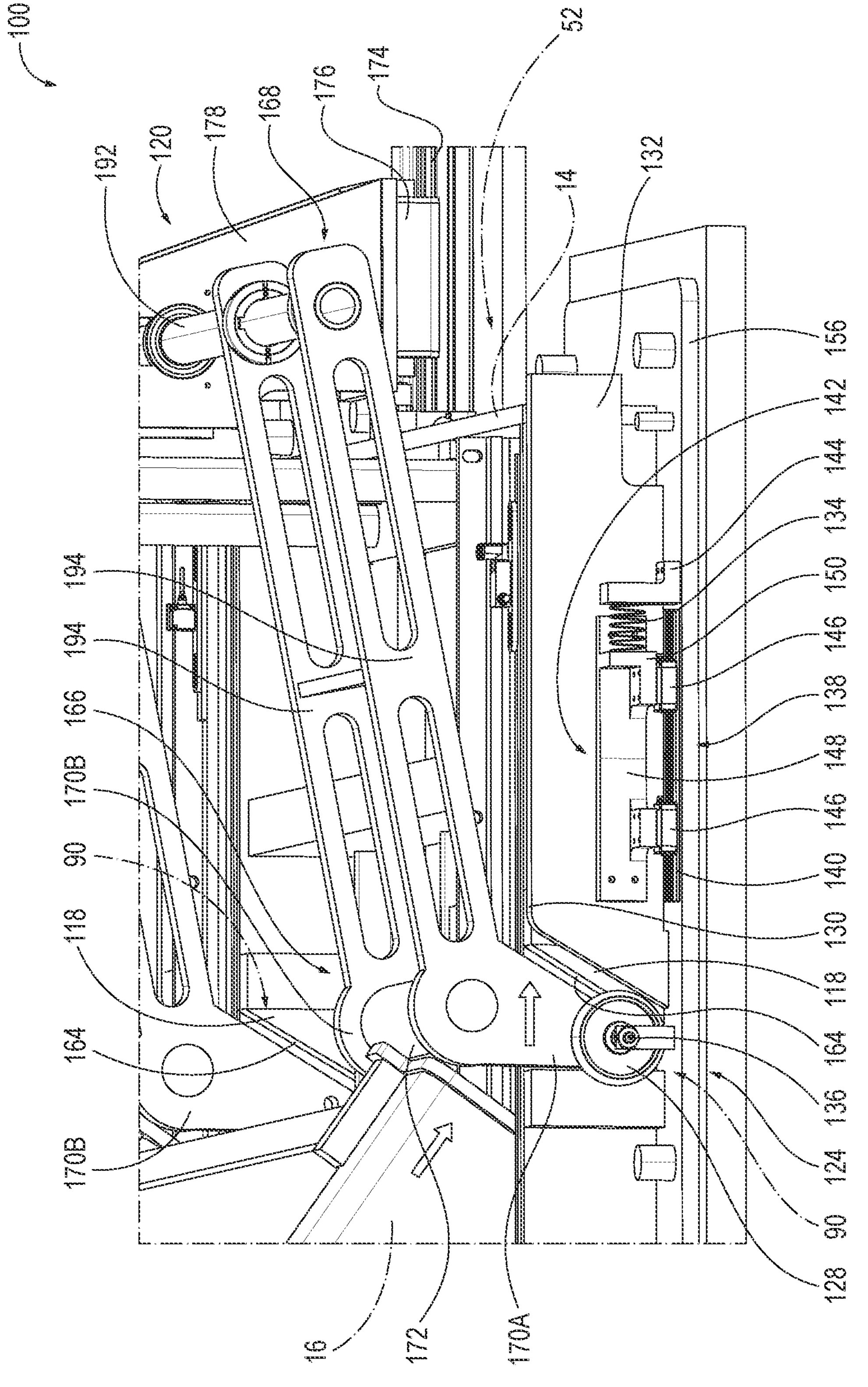
FIG. 12 is a left side perspective view the safety device of FIG. 2 depicting a first set of actions between the scissor lift leg and the bracing structure in response to a collapsing of the scissor lift in accordance with aspects of the present disclosure.
Figure 13:
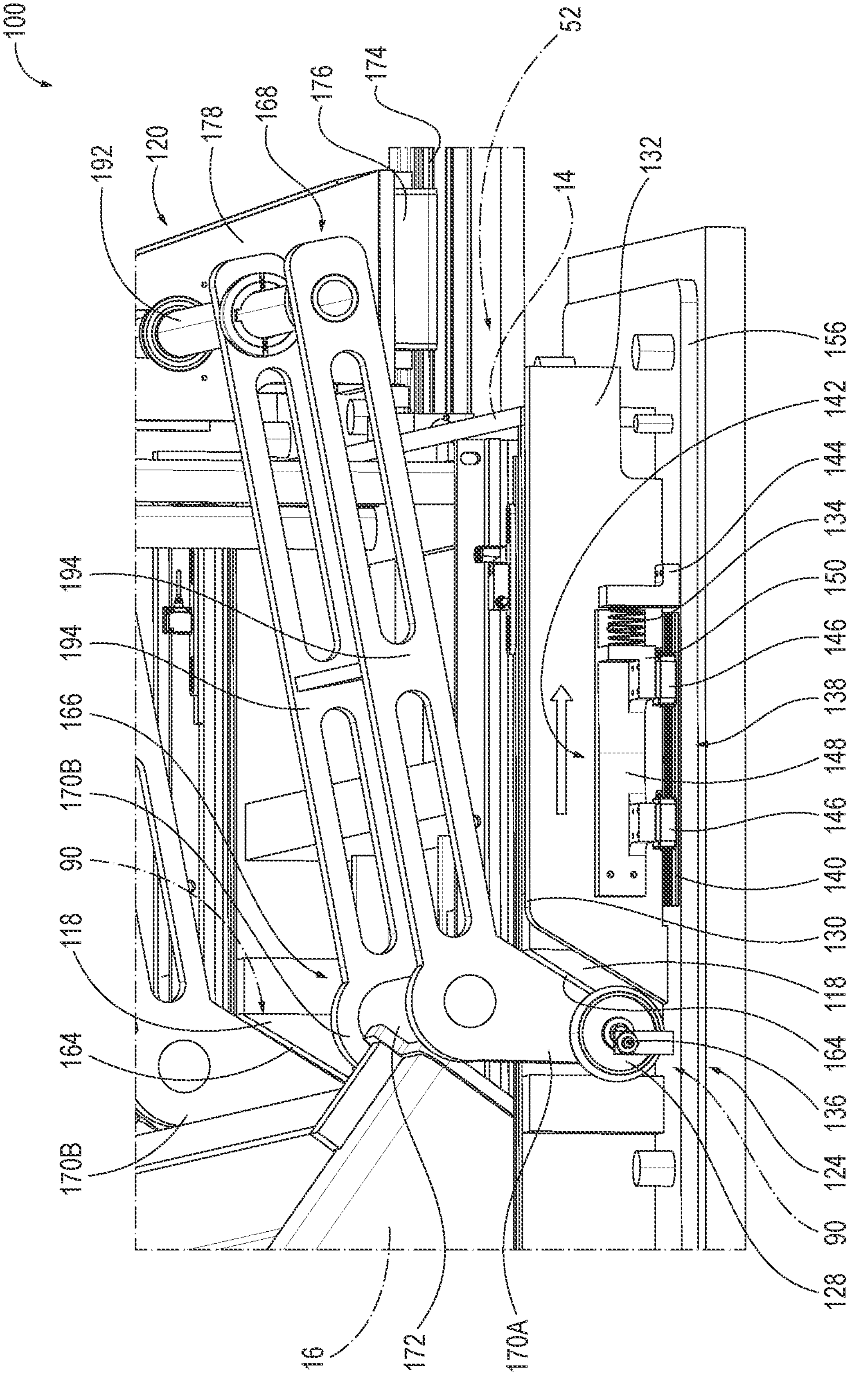
FIG. 13 is a left side perspective view of the safety device of FIG. 2 depicting a second set of actions between the bracing structure and one or more other components of the safety device in response to the first set of actions depicted in FIG. 12 in accordance with aspects of the present disclosure.

The roller-surface body 132 is operably coupled to the support slab 156 and/or the base 14 by a suspension structure 138. FIGS. 12-13 depict the suspension mechanism and composition of the suspension structure 138. The suspension structure 138 includes at least a spring 134 having a first end and a second end, a first spring-contacting member 144, a rail 140, and a sliding member 142 configured to mount and move the roller-surface body 132 along the rail. The rail 140 is coupled to the support slab 156 and/or the base 14 adjacent the roller-surface body 132 and arranged in parallel with both the roller-surface body and the base such that the sliding member 142 of the suspension structure 138 and the guide block 176 of the actuator 122 translate in the same direction. When arranged in parallel with the base 14, the rail 140 has a front-end proximate the block 118 and a rear-end proximate the first end 52 of the base 14.

The first spring-contacting member 144 includes a structure with an L-shaped cross section having a short rectangular front surface and a long rectangular back surface. As shown in FIGS. 12-13, the first spring-contacting member 144 is disposed at, and in-line with, the rear end of the rail 140 and orientated such that the long rectangular back surface is adjacent the rear end of the rail 140. The first spring-contacting member 144 further includes a first contacting face disposed in a middle portion of the long rectangular back surface and configured to couple with the first end of the spring 134. In other examples, the first spring-contacting member may be any suitable structure for operably coupling to the spring 134 and fixedly coupling to the support slab 156 and/or the base 14.

The sliding member 142 includes at least one or more sliding portions 146 and a mounting portion 148. The mounting portion 148 is transversely coupled to the one or more sliding portions 146 on a first side of the one or more sliding portions 146 that faces the roller-surface body 132. The mounting portion 148 is further coupled to the roller-surface body 132 to mount the roller-surface body 132 to the sliding member 142. The sliding member 142 further includes a second spring-contacting member 150 coupled to a second side of the sliding portion 146, the second side of the sliding portion 146 consisting of a rearmost surface with a plane orthogonal to a plane of the first side of the one or more sliding portions 146. The second spring-contacting member 150 extends vertically from the second side of the one or more sliding portions 146 and includes a second contacting face configured to couple with the second end of spring 134.

The spring 134 is disposed between the first spring-contacting member 144 and the second spring-contacting member 150 and coupled to the first contacting face and second contacting face, such that the spring 134 is configured to bias the sliding member 42, and thus the roller-surface body 132, toward the bracing structure 120 when the bracing structure is in the braced position. The spring 134 bias's the roller-surface body 132 towards the bracing structure 120 such that the roller surface 130 of the roller-surface body 132 is disposed at a position between the device engagement surface 164 of the block 118 and the block contacting surface 171 of the bracing structure 120.

By biasing the roller-surface body 132 into position between the block 118 and the bracing structure 120, the spring 134 holds roller-surface body 132 in an arrangement that keeps the bracing structure 120 out of contact with the block 118 when the bracing structure 120 is translated between the retracted and engaged positions. The spring 134 that keeps the bracing structure 120 out of contact with the block 118 is further configured to compress in response to the support leg 16 of the scissor lift 12 engaging with the bracing structure 120 during a collapse of the scissor lift. In response to the collapse of the scissor lift, the spring 134 compresses, permitting the roller-surface body 132 to translate rearwards away from the block 118, which in turn allows the bracing structure 120 to directly engage with the block 118. FIG. 12 depicts a first set of actions that occur in response to a collapse/failing of a scissor lift. A collapse of a scissor lift often occurs in response to a failing of one or more components of a scissor lift system such as the lift mechanism. During a failing of a scissor lift system, the support legs 16 of the scissor lift 12 give out and are forcibly translated out of a mostly vertical orientation (minimum distance position from the central axis of the base 14) and into a mostly horizontal orientation (maximum distance position from central axis of the base 14) causing the platform to fall towards the ground uninhibited. As such, the first set of actions depicted in FIG. 12 include the support leg 16 of the scissor lift 12 being forcibly translated away from the central axis of the base 14, and in response to being translated away from the central axis of the base 14, the support legs 16 selectively engage the second contacting surface 172 of the bracing structure 120. By selectively engaging with the second contacting surface 172, the load of the scissor lift 12 is transferred from the support legs 16 to the bracing structure 120.

In response to selectively engaging with the support legs 16 of the scissor lift, the bracing structure 120 is pushed in a direction towards the block 118 and/or the roller-surface body 132. FIG. 13 depicts the second set of actions that occur in response to the collapse/failing of the scissor lift 12. As shown in FIG. 13, the bracing structure 120 is brought into contact with the block 118, and the roller 128 is pushed into the roller surface 130 of the roller-surface body 132 and exerts a force thereon in response to the second contacting surface 172 of the bracing structure 120 engaging with and receiving the load of the scissor lift 12 from the support legs 16. In response to the force exerted by the roller 128 on the roller-surface body 132, the roller-surface body 132 is translated away from the support leg 16 of the scissor lift 12 and towards the actuator 122, compressing the spring 134. The bracing structure 120 is permitted to directly contact the block 118 in response to the translation of the roller surface-body 132 towards that actuator 122.

The spring 134 is compressed a distance equivalent to the distance between the block-contacting surface 171 of the bracing structure 120 and the device engagement surface 164 of the block 118 when the bracing structure 120 is in the braced position. Said differently, the spring 134 is compressed a distance less than a radius of the roller 128. As such, the suspension structure 138 holds the roller-surface body 132 in a position that keeps the bracing structure 120 from engaging with the block 118 prior to a scissor lift collapse and permits the bracing structure 120 to engage with the block 118 in response the collapse of the scissor lift. The suspension structure 138 may further absorb and reduce the force applied by the bracing structure 120 to the blocks 118, in response to a scissor lift collapse, by cushioning the force transmitted from the bracing structure 120 to the blocks 118.

Figure 14:
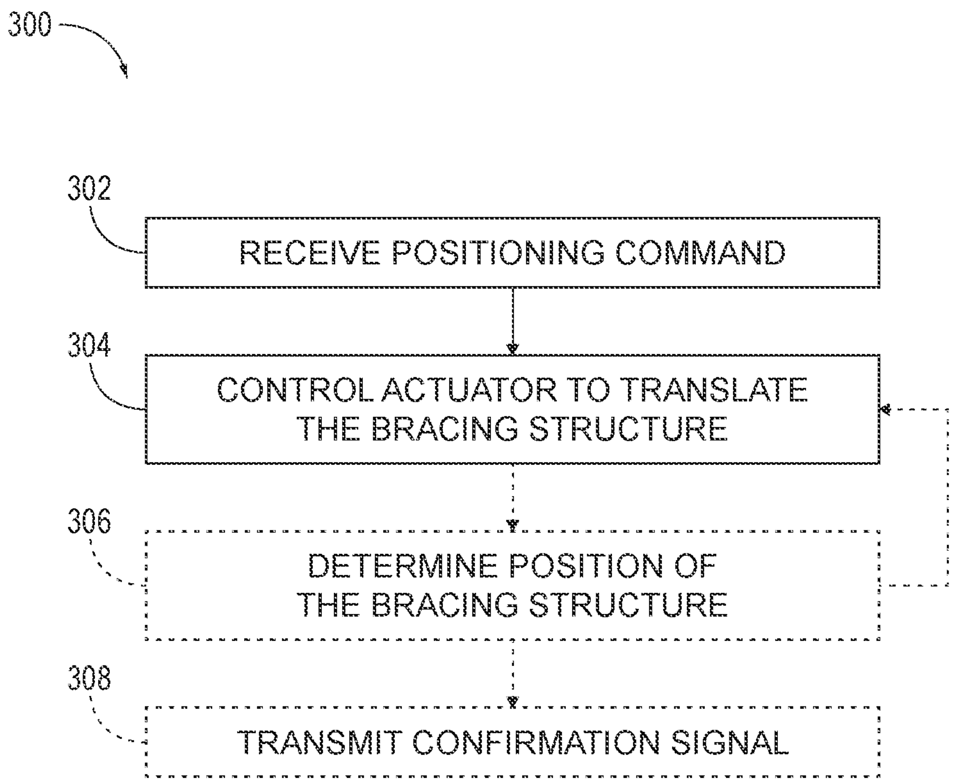
FIG. 14 is a flowchart schematically representing methods of operating safety devices in accordance with aspects of the present disclosure.

FIG. 14 schematically provides a flowchart that represents illustrative, non-exclusive examples of methods of operating a safety device (e.g., safety device 10 or 100) for a scissor lift (e.g., scissor lift) according to the present disclosure. In FIG. 14, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 14 are not limiting and other methods and steps are within the scope of the present disclosure, including methods having greater than or fewer than the number of steps illustrated, as understood from the discussions herein.

As seen in FIG. 14, a method 300 includes receiving 302 a positioning command from a user, translating 304 to a bracing structure (e.g., bracing structure 20, 120), determining 306 the position of the bracing structure, and/or transmitting 308 a confirmation signal. In some examples, the positioning command is transmitted as a signal and received by a control unit (e.g., control unit 80) of the safety device. The positioning command may include a signal indicating a request to translate the bracing structure of the safety device into either the braced position or the retracted position. The user may use a user interface (e.g., user interface 82) and/or any other suitable device for communicating a command to the safety device.

Translating 304 of the method 300 may include controlling an actuator (e.g., actuator 22, 122) to translate the bracing structure according to the received positioning command. In response to receiving a positioning command requesting the bracing structure be in a braced position (e.g., braced position 24, 124), the actuator is configured to push the bracing structure out of a retracted position (e.g., retracted position 26, 126) and in the direction of support legs (e.g., support legs 16) of the scissor lift such that the bracing structure translates along the roller-surface body and into the braced position. Alternatively, in response to receiving a positioning command requesting the bracing structure be in the retracted position, the actuator is configured to pull the bracing structure out of the braced position, up a roller-surface body (e.g., roller-surface body 32, 132), and into the retracted position.

The safety device may include one or more sensors (e.g., sensor 36, 136) configured to detect when the bracing structure is in the braced position. In some examples, the determining 306 further includes querying the one or more sensors for the position of the bracing structure and receiving a response signal from the one or more sensors indicating whether the bracing structure is in the braced position or the retracted position.

In some examples, one or more sensors are disposed adjacent the bracing structure and are configured to detect the presence or absence of a roller (e.g. roller 28, 128) or a first contacting surface (e.g. first contacting surface 70, 170) of the bracing structure when in the braced position. In response to determining that the bracing structure is in the braced position, the one or more sensors may further be configured to send a confirmation signal directly to the user and/or to the control unit of the safety device. In some examples, one or more sensors may further be configured to, in response to determining that the bracing structure is not in the braced position, transmit a signal indicating that the bracing structure is not in the braced position.

In response to receiving a signal from the one or more sensors indicating the bracing structure is in braced position, the control unit is configured to transmit the confirmation signal to the user. In some examples the control unit is configured to transmit the signal to the user interface for review by a user. In some examples, the control unit, in response to receiving a signal from the one or more sensors indicating that the bracing structure was determined to not be in the braced position, transmitting a signal indicating that the bracing structure is not in the braced position to the user.

Illustrative, non-exclusive examples of inventive subject matter according to the present disclosure are described in the following enumerated paragraphs:

A. A safety device (10) for a scissor lift (12) that comprises a base (14) and a support leg (16) configured to translate along the base (14), the safety device (10) comprising:

a block (18) configured to be fixed relative to the base (14) of the scissor lift (12);

a bracing structure (20); and an actuator (22) configured to selectively translate the bracing structure (20) between a braced position (24), in which the bracing structure (20) is operatively positioned between the block (18) and the support leg (16) of the scissor lift (12), and a retracted position (26), in which the bracing structure (20) is not positioned between the block (18) and the support leg (16) of the scissor lift (12).

A1. The safety device (10) of paragraph A, further comprising:

a roller (28) operatively coupled to the bracing structure (20); and a roller surface (30);

wherein the roller (28) is configured to roll along the roller surface (30) when the bracing structure (20) is translated between the braced position (24) and the retracted position (26).

A1.1. The safety device (10) of paragraph A1, wherein the roller surface (30) is biased toward the bracing structure (20) when the bracing structure is in the braced position (24).

A1.1.1. The safety device (10) of paragraph A1.1, further comprising:

a roller-surface body (32) that comprises the roller surface (30); and a spring (34) operatively coupled to the roller-surface body (32) and configured to bias the roller-surface body (32) toward the bracing structure (20) when the bracing structure (20) is in the braced position (24).

A1.1.1.1. The safety device (10) of paragraph A1.1.1, wherein the roller (28) urges the roller-surface body (32) in a direction away from the support leg (16) of the scissor lift (12) and against a bias of the spring (34) when the support leg (16) translates toward and against the bracing structure (20).

A2. The safety device (10) of any of paragraphs A-A1.1.1.1, further comprising:

a sensor (36) configured to detect when the bracing structure (20) is in the braced position (24).

A2.1. The safety device of paragraph A2, wherein, in the braced position (24) the bracing structure (20) is disposed between and spaced from the block (18) and the support leg (16) of the scissor lift (12).

A3. The safety device (10) of any of paragraphs A-A2.1, wherein, in the braced position (24), the bracing structure (20) is configured to restrict movement of the support leg (16) of the scissor lift (12) when the support leg (16) translates toward and against the bracing structure (20).

A4. The safety device (10) of any of paragraphs A-A3, wherein the block (18) comprises a device engagement surface (64) positioned to engage the bracing structure (20) when the support leg (16) of the scissor lift (12) translates toward and against the bracing structure (20).

A4.1. The safety device (10) of paragraph A4, wherein the bracing structure (20) comprises:

one or more brace members (166), wherein each brace member (166) of the one or more brace members (166) comprises a first contacting surface (70) and a second contacting surface (72), and wherein, in the braced position (24), the first contacting surface (70) is positioned to engage the device engagement surface (64) of the block (18) and the second contacting surface (72) is positioned to engage the support leg (16) of the scissor lift (12) when the support leg (16) translates toward and against the bracing structure (20); and an attachment member (68) operatively coupled between each brace member (166) and the actuator (22).

A4.1.1. The safety device (10) of paragraph A4.1, wherein the actuator (22) comprises:

a guide rail (174); and a guide block (176) configured to translate along the guide rail (174) and operatively coupled to the attachment member (68) of the bracing structure (20).

A4.1.1.1. The safety device (10) of paragraph A4.1.1, wherein the actuator (22) further comprises an attachment structure (178) pivotably coupled to the attachment member (68) of the bracing structure (20).

A5. The safety device (10) of any of paragraphs A-A4.1.1.1, wherein the actuator (22) is a pneumatic actuator.

A6. The safety device (10) of any of paragraphs A-A5, further comprising a control unit (80) configured to control the actuator (22) in response to a command received from a user.

A7. The safety device (10) of any of the paragraphs A-A6, wherein the safety device (10) is configured to not interfere with any movement of the scissor lift (12) when the bracing structure (20) is in the retracted position (26).

A8. The safety device (10) of any of paragraphs A-A7, wherein the safety device (10) is configured to be installed on the scissor lift (12) without interfering with any existing structures of the scissor lift (12).

A9. The safety device (10) of any of paragraphs A-A8 in combination with the scissor lift (12), wherein the safety device (10) is operatively installed relative to the scissor lift (12).

B. A method (300) for operating the safety device (10) of any of paragraphs A-A9 to restrict movement of the scissor lift (12), the method (300) comprising:

receiving (302) a positioning command from a user; and in response to the receiving (302), translating (304) the bracing structure (20) between the braced position (24) and the retracted position (26).

B1. The method (300) of paragraph B when depending from paragraph A2, further comprising:

determining (306), with the sensor (36), if the bracing structure (20) is in the braced position (24); and responsive to a determination that the bracing structure (20) is in the braced position (24), transmitting (308) a confirmation signal to the user.

C. The use of the safety device (10) of any of paragraphs A-A9 to restrict movement of the scissor lift (12).

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A safety device for a scissor lift that comprises a base and a support leg configured to translate along the base, the safety device comprising:

a block configured to be fixed relative to the base of the scissor lift;

a bracing structure; and an actuator configured to selectively translate the bracing structure between a braced position, in which the bracing structure is operatively positioned between the block and the support leg of the scissor lift, and a retracted position, in which the bracing structure is not positioned between the block and the support leg of the scissor lift.

2. The safety device of claim 1, further comprising:

a roller operatively coupled to the bracing structure; and a roller surface;

wherein the roller is configured to roll along the roller surface when the bracing structure is translated between the braced position and the retracted position.

3. The safety device of claim 2, wherein the roller surface is biased toward the bracing structure when the bracing structure is in the braced position.

4. The safety device of claim 3, further comprising:

a roller-surface body that comprises the roller surface; and a spring operatively coupled to the roller-surface body and configured to bias the roller-surface body toward the bracing structure when the bracing structure is in the braced position.

5. The safety device of claim 4, wherein the roller urges the roller-surface body in a direction away from the support leg of the scissor lift and against a bias of the spring when the support leg translates toward and against the bracing structure.

6. The safety device of claim 1, further comprising:

a sensor configured to detect when the bracing structure is in the braced position.

7. The safety device of claim 6, wherein, in the braced position the bracing structure is disposed between and spaced from the block and the support leg of the scissor lift.

8. The safety device of claim 1, wherein, in the braced position, the bracing structure is configured to restrict movement of the support leg of the scissor lift when the support leg translates toward and against the bracing structure.

9. The safety device of claim 1, wherein the block comprises a device engagement surface positioned to engage the bracing structure when the support leg of the scissor lift translates toward and against the bracing structure.

10. The safety device of claim 9, wherein the bracing structure comprises:

one or more brace members, wherein each brace member of the one or more brace members comprises a first contacting surface and a second contacting surface, and wherein, in the braced position, the first contacting surface is positioned to engage the device engagement surface of the block and the second contacting surface is positioned to engage the support leg of the scissor lift when the support leg translates toward and against the bracing structure; and an attachment member operatively coupled between each brace member and the actuator.

11. The safety device of claim 10, wherein the actuator comprises:

a guide rail; and a guide block configured to translate along the guide rail and operatively coupled to the attachment member of the bracing structure.

12. The safety device of claim 11, wherein the actuator further comprises an attachment structure pivotably coupled to the attachment member of the bracing structure.

13. The safety device of claim 1, wherein the actuator is a pneumatic actuator.

14. The safety device of claim 1, further comprising a control unit configured to control the actuator in response to a command received from a user.

15. The safety device of claim 1, wherein the safety device is configured to not interfere with any movement of the scissor lift when the bracing structure is in the retracted position.

16. The safety device of claim 1, wherein the safety device is configured to be installed on the scissor lift without interfering with any existing structures of the scissor lift.

17. The safety device of claim 1 in combination with the scissor lift, wherein the safety device is operatively installed relative to the scissor lift.

18. A method for operating the safety device of claim 1 to restrict movement of the scissor lift, the method comprising:

receiving a positioning command from a user; and in response to the receiving, translating the bracing structure between the braced position and the retracted position.

19. The method of claim 18, wherein the safety device further comprises a sensor configured to detect when the bracing structure is in the braced position, and wherein the method further comprises:

determining, with the sensor, if the bracing structure is in the braced position; and responsive to a determination that the bracing structure is in the braced position, transmitting a confirmation signal to the user.

20. A safety device for a scissor lift that comprises a base and a support leg configured to translate along the base, the safety device comprising:

a block configured to be fixed relative to the base of the scissor lift;

a bracing structure;

an actuator configured to selectively translate the bracing structure between a braced position, in which the bracing structure is operatively positioned between the block and the support leg of the scissor lift, and a retracted position, in which the bracing structure is not positioned between the block and the support leg of the scissor lift;

a roller operatively coupled to the bracing structure;

a roller-surface body that comprises a roller surface, wherein the roller is configured to roll along the roller surface when the bracing structure is translated between the braced position and the retracted position, and wherein the roller surface is biased toward the bracing structure when the bracing structure is in the braced position;

a spring operatively coupled to the roller-surface body and configured to bias the roller-surface body toward the bracing structure when the bracing structure is in the braced position; and a sensor configured to detect when the bracing structure is in the braced position;

wherein the roller urges the roller-surface body in a direction away from the support leg of the scissor lift and against a bias of the spring when the support leg translates toward and against the bracing structure;

wherein, in the braced position, the bracing structure is disposed between and spaced from the block and the support leg of the scissor lift;

wherein, in the braced position, the bracing structure is configured to restrict movement of the support leg of the scissor lift when the support leg translates toward and against the bracing structure;

wherein the block comprises a device engagement surface positioned to engage the bracing structure when the support leg of the scissor lift translates toward and against the bracing structure;

wherein the bracing structure comprises:

one or more brace members, wherein each brace member of the one or more brace members comprises a first contacting surface and a second contacting surface, and wherein, in the braced position, the first contacting surface is positioned to engage the device engagement surface of the block and the second contacting surface is positioned to engage the support leg of the scissor lift when the support leg translates toward and against the bracing structure; and an attachment member operatively coupled between each brace member and the actuator; and wherein the actuator comprises:

a guide rail; and a guide block configured to translate along the guide rail and operatively coupled to the attachment member of the bracing structure; and an attachment structure pivotably coupled to the attachment member of the bracing structure.

* * * * *